United States Patent [19]

Geshwind et al.

[11] Patent Number: 4,925,294
[45] Date of Patent: May 15, 1990

[54] METHOD TO CONVERT TWO DIMENSIONAL MOTION PICTURES FOR THREE-DIMENSIONAL SYSTEMS

[76] Inventors: David M. Geshwind, 184-14 Midland Pkwy., Jamaica, N.Y. 11432; Anthony H. Handal, Blue Chip La., Westport, Conn. 06880

[21] Appl. No.: 227,403

[22] Filed: Dec. 17, 1986

[51] Int. Cl.$^5$ .............................................. G03B 35/14
[52] U.S. Cl. ...................................... 352/57; 352/86; 355/40
[58] Field of Search ............... 355/40, 52, 77; 352/43, 352/57, 85, 86, 129; 358/88, 89, 22, 81, 160

[56] References Cited

U.S. PATENT DOCUMENTS

| | | | |
|---|---|---|---|
| 3,772,465 | 11/1973 | Vlahos et al. | 355/40 |
| 3,824,336 | 7/1974 | Gould et al. | 355/52 |
| 4,606,625 | 8/1986 | Geswind | 352/85 X |
| 4,809,065 | 2/1989 | Harris et al. | 358/88 |

Primary Examiner—L. T. Hix
Assistant Examiner—D. Rutledge

[57] ABSTRACT

The present invention relates to the computer-assisted processing of standard two-dimensional motion pictures to generate processed image sequences which exhibit some three-dimensional depth effects when viewed under appropriate conditions.

44 Claims, 2 Drawing Sheets

METHOD TO CONVERT TWO DIMENSIONAL MOTION PICTURES FOR THREE-DIMENSIONAL SYSTEMS

TECHNICAL FIELD

The invention relates to a method for converting existing film or videotape motion pictures to a form that can be used with three-dimensional systems for broadcast or exhibition.

BACKGROUND ART

With the advent of stereophonic sound, various techniques were developed to convert or 're-process' existing monophonic programs for stereophonic broadcast or recording systems. These included modifying the equalization phase or tonal qualities of separate copies of the monophonic program for the left and right channels. While true stereophonic or binaural effects may not have been achieved, the effects were much improved over feeding the identical monophonic signal to both channels.

Similarly, with the almost universal use of color production, exhibition and broadcast systems for motion pictures and television, systems have been developed to convert existing monochrome or black and white materials to color programs. Such a systems is described in applicant Geshwind's Pat. No. 4,606,625, issued Aug. 19, 1986. The results of these colorized products, while not always identical to true color motion pictures, are more suitable than black and white for color systems.

There have been a number of systems for exhibition or display of left- and right-eye pairs of binocular motion pictures. Early systems required two completely redundant projection or display systems; e.g. two film projectors or CRT television displays, each routed to one eye via mirrors. Other systems require either complicated and expensive projection or display systems, or expensive 'glasses' to deliver two separate images. For example:

- red- and green-tinted monochrome images are both projected or displayed to be viewed through glasses with left and right lenses tinted either red or green;
- two full-color images are projected through mutually perpendicular polarized filters and viewed through glasses with lenses that are also polarized in the same manner;
- left and right images are displayed on alternate odd and even fields (or frames) of a standard (or high scan rate) television CRT and are viewed through 'glasses' with shutters (either rotating blades or flickering LCDs, for example) that alternate the view of left and right eyes in synchrony with the odd or even fields of the CRT.

Of the above systems, the second is not at all usable with standard home television receivers, the third requires very expensive 'glasses' and may flicker with standard home receivers, and the first produces only strangely tinted monochrome images. Further, none of the systems may be broadcast over standard television for unimpeded viewing without special glasses.

Thus, until now, compatible (i.e., viewable as two-dimensional, without glasses) home reception of b 3-D images was not possible. However, a new system, which takes advantage of differential processing of left- and right-eye images in the human perceptual system, delivers a composite image on a standard home television receiver that can be viewed as a normal 2-D picture without glasses. Very inexpensive glasses, with one light and one dark lens, accentuate the differential processing of the image, as viewed by each eye, to produce a 3-D depth effect.

Practical, inexpensive, compatible (with standard TV) 3-D television may now become widespread. In addition to materials specifically produced for the new system (or other 3-D systems) conversion of standard 2-D programs to 3-D format would provide additional product to broadcast using the new compatible system (or for other 3-D projection systems).

SUMMARY OF THE INVENTION

Applicant Handal's previous application, No. 479,679, filed Mar. 28, 1983 and now abandoned, relates a process and apparatus for deriving left- and right-eye pairs of binocular images, from certain types of two dimensional film materials. In particular, the materials must consist of separate foreground and background elements, such as cartoon animation cells and background art. By taking into account the parallax between scenes as viewed by the left and right eyes, two images are prepared where foreground elements are shifted with respect to background elements by an amount that indicates their depth in the third dimension. Two-dimensional motion pictures that consist of a series of single composite images could not be converted to three-dimensional format, by this technique, without first being separated into various background and foreground elements.

Once committed to two-dimensional motion pictures, the separation and depth information for various scene elements, in the third dimension, are lost. Thus, the separation of two-dimensional image sequences into individual image elements and the generation of three-dimensional depth information for each such image element are not simple or trivial tasks, and are the further subject of the instant invention.

In accordance with the invention, standard two-dimensional motion picture film or videotape may be converted or processed, for use with three-dimensional exhibition or transmission systems, so as to exhibit at least some three-dimensional or depth characteristics. Separation of a single 2-D image stream into diverse elements is accomplished by a computer assisted, human operated system. (If working from discrete 2-D film sub-components, such as animation elements, the separation step may be omitted.) Depth information is assigned to various elements by a combination of human decisions and/or computer analyses and resulting images of three-dimensional format are produced under computer control.

BRIEF DESCRIPTION OF DRAWINGS

A method for carrying out the invention is described in the accompanying drawings in which.

DETAILED DESCRIPTION

An immense amount of standard, 2-D motion picture material exists in the form of film and videotape. In addition, certain materials exist in the form of discrete 2-D image sub-components, such as animated cell and background paintings. As the use of 3-D exhibition and broadcast systems becomes more widespread, the conversion of existing 2-D programs to a format that will exhibit at least some 3-D or depth effects, when used with 3-D systems, is desired.

Extracting individual image elements or 3-D depth information from a 2-D film frame, or synthesizing 3-D information for those elements, entirely by computer equipped with artificial intelligence, is not now practical. Therefore, the embodiment of the invention as described herein employs a high degree of human interaction with the computer. However, as artificial intelligence progresses, a predominantly or completely automated system may become practical and is within the intended scope of the invention.

Figure 1:
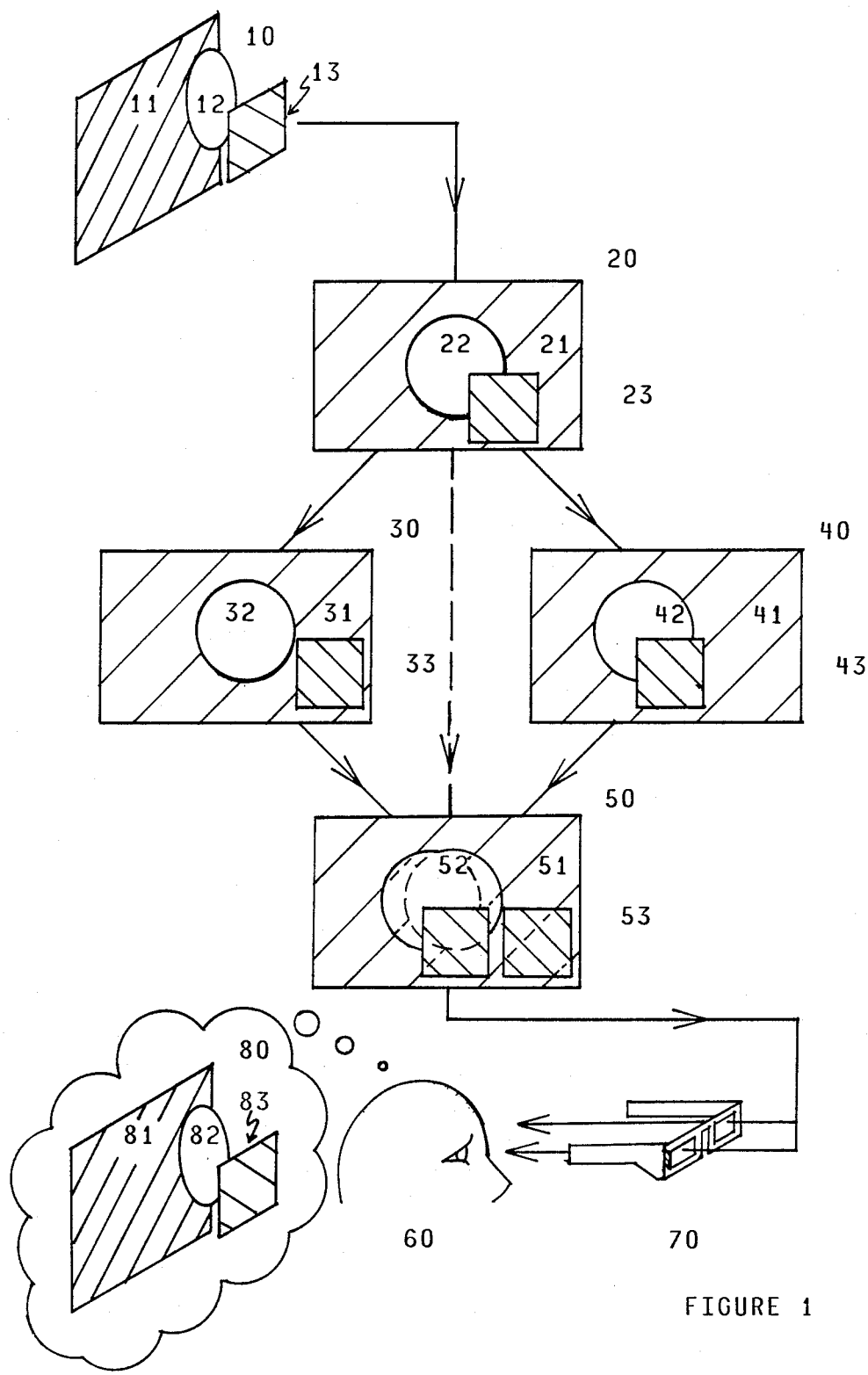
FIG. 1 is a diagram illustrating the relationship of a 2-D source film image, left and right image pairs, and a composite 3-D image frame.

FIG. 1 shows a frame 20 of a standard 2-D film of video motion picture, consisting of a cross-hatched background plane 21, a large white circle 22 in the mid-ground, and a small black square 23 in the foreground. It is a 2-D representation of original 3-D scene 10 comprising elements 11, 12 and 13, which is not available for direct 3-D photography. After human identification of individual image elements and depth assignment, the computer generates, from frame 10, a pair of coordinated left 30 and right 40 images with backgrounds 31 and 41, circles 32 and 42, and squares 33 and 43 respectively. Note that the relative positions of the square and circle are different in the left and right images; this situation is similar to the parallax that might result between left- and right-eye views if one were to have viewed the original scene 10 directly. Three-dimensional format frame 50 is generated by encoding the information in the left 30 and right 40 image pair, in a manner consistent with any one of a number of existing 3-D systems. The specific operation of these various 3-D systems is not the subject of the instant invention.

Alternately, the steps of generating and encoding 3-D information may be combined such that 3-D format frame 50 may be processed directly from 2-D frame 20 without generating left 30 and right 40 image pairs. In either case, 3-D format frame 50 when viewed by human 60 through 3-D glasses 70 is perceived as 3-D scene 80, containing elements 81, 82 and 83, which has at least some of the 3-D characteristics of original 3-D scene 10.

Various systems for the encoding, display, projection, recording, transmission or viewing of 3-D images exist, and new systems may be developed. Specifically, various techniques for specifying, encoding and viewing 3-D information may now, or come to, exist, which do not make use of parallax offset and/or left and right image pairs and/or viewing glasses, or which embody new techniques or changes and improvements to current systems. Further, such systems may integrate information from more than one 2-D source frame 20 into a single resultant 3-D frame 50. The specifics of operation of such systems is not the subject of the instant invention, however, preparation of 2-D program material for such systems is.

The offsets shown for elements 31, 32 and 33 in left frame 30 and elements 41, 42 and 43 in right frame 40 are meant to be illustrative and do not necessarily follow the correct rules for image parallax. In fact, depending upon where viewer attention is meant to be centered, different rules may apply. For example, one technique is to give no parallax offset to far background elements and to give progressively more parallax offset to objects as they get closer. Alternately, attention may be centered in the mid-ground with no parallax offset to mid-range objects, some parallax offset to close-range objects and reverse parallax offset to far-range objects. The particular placement of objects and attention point in the 3-D scene is as much an art as a science and is critical to the enjoyment of 3-D programs and, in any event, is not meant to be the subject of this invention.

Figure 2:
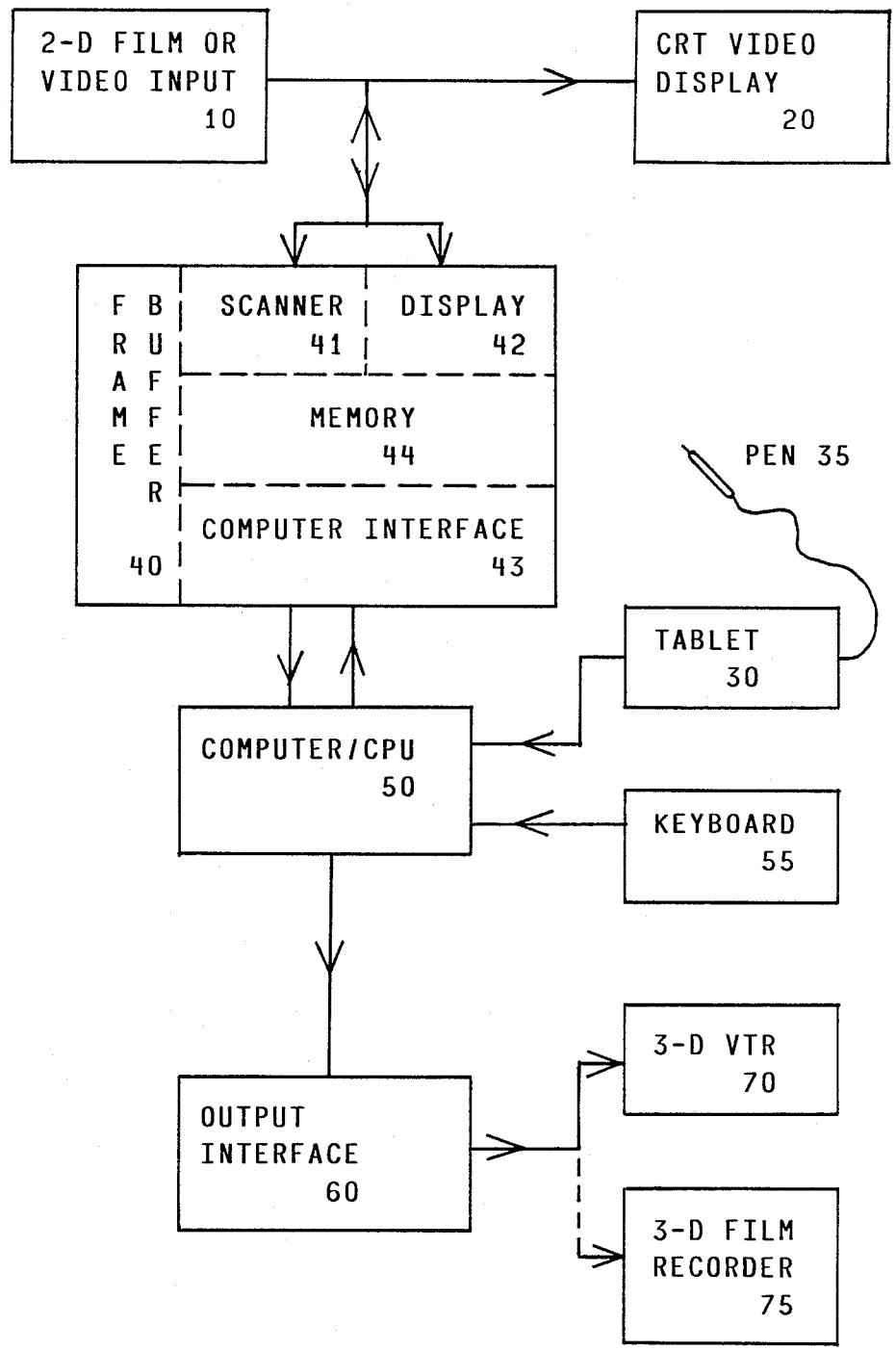
FIG. 2 is a schematic diagram of a system for carrying out an implementation of the present invention.

FIG. 2 shows a schematic of a system to implement the instant invention. A 2-D film or video image 10 is input to a video monitor 20 and to the scanning portion 41 of frame buffer 40. Video monitor 20 is capable of displaying either the 2-D image being input 10 or the output from display portion 42 of frame buffer 40.

Frame buffer 40 consists of an image scanner 41 which can convert the input image into digital form to be stored in a portion of frame buffer memory section 44, a display section 42 which creates a video image from the contents of a portion of memory section 44, and a computer interface section 43 which allows the computer CPU 50 to read from and write to the memory section 44.

Graphic input tablet 30 and stylus 35 allow the human operator to input position information to the computer 50 which can indicate the outline of individual image elements, choice of a specific image element or part of an image element, depth specification, choice of one of a number of functions offered on a 'menu', or other information. An image cursor can be displayed on monitor 20 by frame buffer 40 to visually indicate the location or status of the input from the tablet 30 and pen 35. Text and numeric information can also be input by the operator on keyboard 55.

Computer CPU 50 is equipped with software which allows it to interpret the commands and input from the human operator, and to process the digitized 2-D information input from 2-D frame 10 into digital 3-D frame information, based on said human commands and input. Said digital 3-D frame information is then output by output interface 60 (which may be similar to frame buffer 40 or of some other design) to a videotape recorder 70 or to a film recorder 75, capable of recording 3-D format frames.

The system as described above operates as follows. A frame of the 2-D program is displayed on the video monitor for viewing by the human operator. With the tablet and stylus the operator outlines various 2-D image areas to indicate to the computer the boundaries of various image elements to be separately processed. (For materials, such as animation components, that already exist as separate elements, the previous stage of the process may be skipped.) Depth position information, in the third dimension, is determined for each image element, by a combination of operator input and computer analysis. Left and right image pairs or a 3-D composite image is processed by the computer, from the 2-D input image, based on the computer software and operator instructions. Depending upon the particular 3-D system to be used, left- and right-image pairs may or may not be the final stage or an intermediate stage or bypassed entirely. Further, for some 3-D systems, information from more than one 2-D source frame may be combined into one 3-D frame (or frame pair). In any event, the final 3-D information is then collected on a videotape or film recorder. The process is then repeated for additional 2-D frames.

Each image element may be given a uniform depth designation which may cause the perception of 'cardboard cut-out' characters. Alternately, different portions of a single image element may be given different depth designations with the computer interpolating depth coordinates over the entire element. For example, an image element positioned diagonally in a frame may have its right edge designated to be closer than its left edge. Alternately, one feature of an image element, say a person's nose in a close-up, might be designated as being closer than the rest of the image element. In such manner, the computer would be instructed to interpolate and process depth information over the entire image element. Such processing of the image element, in accordance with varying depth information, may result in the stretching, skewing or other distortion of the image element.

Depth interpolation may also be carried out over time, between frames. For example, an image element might be designated to be close in one frame and to be far away in a later frame. The depth of the image element may be interpolated for the frames between the two designated frames. Further, the position of the image element in the two dimensions of the film frame, and the steps of the outline separating the image element from the rest of the source image, may also be interpolated over time, between frames Linear and non-linear interpolation techniques are well known and may be readily applied.

It is also possible to add random noise to the depth information to eliminate the appearance of flat objects moving in space and to help achieve greater realism.

For a particular image element, depth position may be derived by the computer, alone or with operator input, by measuring the size of the image element in a frame. For example, once a person were outlined, his overall height in the 2-D film frame might be extracted by the computer as an indication of depth distance. using knowledge, or making assumptions, about the object's real size, and the characteristics of the camera and lens, the distance of the object from the camera may be calculated by applying well known principles of perspective and optics. Alternately, if overall size cannot be easily extracted by the computer, key points might be indicated by the operator for the computer to measure. Comparing the change of size of an image element in several frames will provide information about the movement of the object in the third dimension.

It should be noted that horizontal parallax offsets are, by far, more obvious, due to the fact that our eyes are separated in the horizontal direction. However, vertical offset differences between left- and right-eye views may also be appropriate.

As various image elements are separated and assigned depth values, a situation develops where diverse objects exist in a 'three-dimensional space' within the computer. It should be noted that, in order to display a realistic representation of the entire scene, forwardmost objects must obscure all or part of rearmost objects with which they overlap (except in the case where a forwardmost object were transparent). When generating left- and right-eye views, the pattern of overlap of image elements, and thus the pattern of obscuring of image elements will, in general, be different. Further, for image elements that have been assigned non-uniform depth values (e.g., image elements that are not flat or not in a plane perpendicular to the third dimension) the intersection between these image elements, for the purpose of one obscuring the other, may be non-trivial to calculate. However, there are well known techniques, that have been developed for computer image synthesis, that allow for the sorting, intersection and display of diverse, overlapping 3-D image elements.

As image elements are separated from background scenes or each other, holes may develop. The computer software will compensate for this by filling in missing information in one particular 2-D frame with the equivalent part of the image element from earlier or later frames whenever possible. Alternately, material to 'plug holes' may be created by the operator or by the computer from adjacent areas or may be newly synthesized. Further, as two image elements are separated from each other, the forwardmost of the two may be moved closer to the viewer; hence, it may be appropriate to make it larger. Thus, the increased size may cover the gaps in the rearmost element of the two.

As part of the processing to be performed on the 2-D source image, individual image elements or composite images, additional effects may be programmed into the computer to heighten the sense of depth. For example, shadows cast by one image element on another element or the background may be calculated and inserted; far distant landscape elements may be made hazy or bluish to indicate remoteness; different image elements may be blurred or sharpened to simulate depth-of-field; or, the distance between close objects may be exaggerated to emphasize their separation. There are, of course, other technical or artistic techniques that can be used to indicate depth in an image and which may also be incorporated into the image processing programs and would therefore be part of the invention as described herein. Therefore, the above examples are illustrative and should not be construed as limiting the scope of the invention. Alternately, depth information may be intentionally distorted for effect or for artistic purposes.

Improvements may be made to the final product by including new image elements that were not part of the original 2-D source image. These could include 2-D image elements that are then assigned depth values, 3-D image elements created by 3-D photography and then entered into the computer as left- and right-image pairs, for example, or synthetic 3-D computer generated graphics. In particular, since computer generated image elements can be created with depth information, they can be easily integrated into the overall 3-D scene with vivid effect. For example, a 3-D laser blast could be created by computer image synthesis such that it would in turn obscure and be obscured by other image elements in an appropriate manner and might even be created so as to appear to continue beyond the front of the screen into 'viewer space'.

Animated film components usually have relatively few background paintings, which are kept separate from the animated characters in the foreground. For these, or for live 2-D filmed scenes, once the foreground elements have been separated from the background, the flat 2-D backgrounds may be replaced by 3-D backgrounds. The 3-D backgrounds might consist of computer generated graphics, in which case depth information for the various elements of the background would be available at the time of the background creation. Alternatively, 3-D backgrounds might be created using 3-D photography, in which case depth information for the background elements may be derived, by the computer, from the comparison of the left- and right-image pairs of the 3-D background photographs and applying known image processing and pattern recognition techniques. Alternately, depth information to create 3-D backgrounds may be specified otherwise by operator input and/or computer processing. Once depth information is available for the various background elements, it may compared to depth information for the other image elements with which it is to be combined in each frame. Thus, the 3-D background may itself hve some depth and, in effect, be a 'set' within which other image elements may be positioned in front of, behind or intersecting various background elements for added realism.

It should be noted that, intended purpose and software algorithms aside, the design and operation of the 3-D conversion system described herein has many similarities with the black and white footage colorization system described in applicant Geshwind's Pat. No. 4,606,625. They are both computer-aided systems which display standard film images to an operator, allow the operator to input information separating various image elements within the frame, allow the operator to specify attributes (color in one case, depth in the other) for the image elements, and cause the computer to process new image frames from the original, based on the operator input. Thus, the processing of 2-D black and white footage to add both color and depth information would be much more efficient than implementing each process separately.

The scope of the instant invention is the conversion or processing of 2-D program material for use with any 3-D exhibition or distribution system now in use or later developed, but not the specific method of operation of any particular 3-D system.

It will thus be seen that the objects set forth above, among those made apparent from the proceeding description, are efficiently attained and certain changes may be made in carrying out the above method and in the construction set forth. Accordingly, it is intended that all matter contained in the above description or shown in the accompanying figures shall be interpreted as illustrative and not in a limiting sense.

Now that the invention has been described, what is claimed as new and desired to be secured by Letters Patent is:

1. A method of converting a two-dimensional image frame into a three-dimensional image frame consisting of the steps of:
   a. inputing a frame of a two-dimensional image into a computer;
   b. specifying at least two individual image elements in the two-dimensional image;
   c. separating the two-dimensional image into said image elements;
   d. specifying three-dimensional information for at least one of said image elements;
   e. processing at least one of said image elements to incorporate said three-dimensional information and create at least one processed image element;
   f. generating at least one processed image frame comprising at least one of said processed image elements.

2. A method as in claim 1 wherein said step f results in the generation of a left and right pair of processed image frames.

3. A method as in claim 2 comprising the additional step of:
   g. combining said left and right image pair into a single processed image.

4. A method as in claim 2 comprising the additional step of:
   g. encoding said left and right processed image pair for viewing, by coloring each of said pair different colors.

5. A method as in claim 2 comprising the additional step of:
   g. encoding said left and right processed image pair for viewing, by passing each of said pair through mutually perpendicularly polarized filters.

6. A method as in claim 2 comprising the additional step of:
   g. encoding said left and right processed image pair for viewing, by incorporating said image pair into a video signal suitable for displaying each of said pair alternately on a video display.

7. As method as in claim 1, wherein said step f results in a processed image frame such that, when viewed through glasses with one dark and one light lens, 3-dimensional effects are perceived.

8. A method as in claim 1 comprising the additional step of:
   g. recording said processed image frame.

9. A method as in claim 7 comprising the additional step of:
   g. recording said processed image frame.

10. A method as in claim 1 wherein said steps are applied to successive frames in a motion picture sequence.

11. A method as in claim 2 wherein said steps are applied to successive frames in a motion picture sequence.

12. A product produced by the method described in claim 7.

13. A product produced by the method described in claim 10.

14. A product produced by the method described in claim 11.

15. A product produced by the method described in claim 1.

16. A method as in claim 1 wherein at least one of said processed image elements produced in step e is a shadow element.

17. A method as in claim 1 wherein at least one of said image elements in step e is processed to include additional two-dimensional image information not contained in the original unprocessed two-dimensional image.

18. A method as in claim 17 wherein said additional two-dimensional image information is derived from another image.

19. A method as in claim 1 wherein said processed image elements in step f are combined with at least one additional 3-D image element not derived from the source image to create said processed image frame.

20. A method as in claim 19 wherein said additional 3-D image element is derived from a 3-D photograph.

21. A method as in claim 19 wherein said additional 3-D image element is derived from a computer generated 3-D image.

22. A method as in claim 1 wherein said three-dimensional information for at least one of said image elements in step d is specified only at certain points and is interpolatively derived for other points on said image element.

23. A method as in claim 10 wherein said three-dimensional information for at least one of said image elements in step d is specified only for certain frames and is temporally interpolated for frames between said certain frames.

24. A method as in claim 10 wherein said specification of at least one of said image elements in step b is specified only for certain frames and is temporally interpolated for frames between said certain frames.

25. A method as in claim 1 wherein random noise is added to the three-dimensional information specified in step d.

26. A method as in claim 1 wherein at least some of said three-dimensional information specified in step d is derived from the measurement of at least one aspect of an image element.

27. A method as in claim 26 wherein said aspect pertains to geometry.

28. A method as in claim 26 wherein said aspect pertains to illumination.

29. A method as in claim 10 wherein at least some of said three-dimensional information specified in step d is derived from the measurement of the change of at least one aspect of an image element in successive frames.

30. A method as in claim 29 wherein said aspect pertains to geometry.

31. A method as in claim 29 wherein said aspect pertains to illumination.

32. A method as in claim 1 wherein said two-dimensional image frame is a black and white image frame, said image elements are black and white image elements, and said processing includes the process of adding color to at least one of said black and white image elements.

33. A method as in claim 32 wherein said steps are applied to successive frames in a motion picture sequence.

34. A product produced by the method of claim 33.

35. An apparatus for converting a two-dimensional image frame into a three-dimensional image frame comprising, in combination:
   a. a means for scanning said two-dimensional image frame into a computer;
   b. a means for specifying individual image elements in said frame;
   c. a means for separating said frame into said individual elements;
   d. a means for specifying three-dimensional information for said individual image elements;
   e. a means for processing said individual image elements to create processed image elements;
   f. a means for creating said three-dimensional image frame comprising at least one of said processed image elements;
   g. a means for outputing said three-dimensional image frame.

36. An apparatus for converting a two-dimensional image sequence into a three-dimensional image sequence and producing a three-dimensional image recording comprising, in combination:
   a. a means for scanning said sequence into a computer;
   b. a means for specifying individual image elements in said sequence;
   c. a means for separating said sequence into said individual image elements;
   d. a means for specifying three-dimensional information for said individual image elements;
   e. a means for processing said individual image elements to create processed image elements;
   f. a means for combining said processed image elements into a processed image sequence;
   g. a means for outputting said three-dimensional image sequence;
   h. a means for recording said three-dimensional image sequence.

37. A method of converting a two-dimensional image frame into a three-dimensional image frame consisting of the steps of:
   a. inputing frames of a two-dimensional image sequence into a computer;
   b. specifying at least two individual image elements in the two-dimensional image sequence;
   c. separating the two-dimensional images into said image elements;
   d. specifying three-dimensional information for at least one of said image elements;
   e. processing at least one of said image elements to incorporate said three-dimensional information and create at least one processed image elements;
   f. generating a sequence of processed image frames comprising at least one of said processed image elements said generation to be of such a nature so as to exhibit three-dimensional depth characteristics when viewed using a complementary display system.

38. A method as in claim 37 comprising the additional step:
   g. transmission of said three-dimensional image sequence.

39. A method as in claim 33 comprising the additional step:
   g. recording of said three-dimensional image sequence.

40. A method as in claim 37 wherein said two-dimensional image sequence is a black and white image sequence, said image elements are black and white image elements, and said processing includes the process of adding color to at least one of said black and white image elements.

41. A product produced by the method of claim 40.

42. A method of converting a two-dimensional image frame into a three-dimensional image frame consisting of the steps of:
   a. inputing frames of a two-dimensional image sequence into a computer, each of said frames consisting of at least two individual image elements;
   b. specifying three-dimensional information for at least one of said image elements;
   c. processing at least one of said image elements to incorporate said three-dimensional information and create at least one processed image element;
   d. generating a sequence of processed image frames comprising at least one of said processed image elements.

43. A method as in claim 42 wherein said individual image elements in step a are derived from sub-components of an animated film.

44. A product produced by the method described in claim 42.

* * * * *

(12) EX PARTE REEXAMINATION CERTIFICATE (9390th)
United States Patent
Geshwind et al.

(10) Number: US 4,925,294 C1
(45) Certificate Issued: Nov. 2, 2012

(54) METHOD TO CONVERT TWO DIMENSIONAL MOTION PICTURES FOR THREE-DIMENSIONAL SYSTEMS

(75) Inventors: David M. Geshwind, Jamaica, NY (US); Anthony H. Handal, Westport, CT (US)

(73) Assignee: Anne C. Avellone

Reexamination Request:
No. 90/007,578, Jun. 9, 2005

Reexamination Certificate for:
Patent No.: 4,925,294
Issued: May 15, 1990
Appl. No.: 07/227,403
Filed: Dec. 17, 1986

(51) Int. Cl.
*G03B 35/14* (2006.01)

(52) U.S. Cl. ........... 352/57; 348/E13.008; 348/E13.019; 348/E13.02; 348/E13.039; 348/E13.033; 352/86; 355/40

(58) Field of Classification Search ................ None
See application file for complete search history.

(56) References Cited

To view the complete listing of prior art documents cited during the proceeding for Reexamination Control Number 90/007,578, please refer to the USPTO's public Patent Application Information Retrieval (PAIR) system under the Display References tab.

*Primary Examiner* — Anjan Deb

(57) ABSTRACT

The present invention relates to the computer-assisted processing of standard two-dimensional motion pictures to generate processed image sequences which exhibit some three-dimensional depth effects when viewed under appropriate conditions.

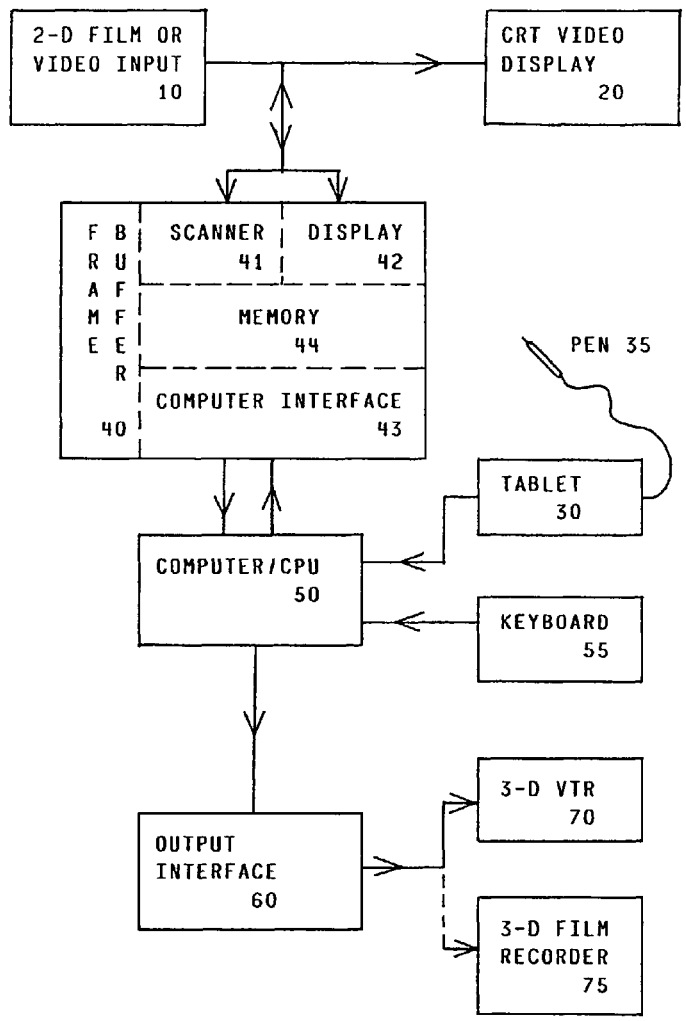

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 25 is confirmed.

Claims 1-24 and 26-44 are cancelled.

\* \* \* \* \*